United States Patent Office 3,126,341
Patented Mar. 24, 1964

3,126,341
PERYLIMID GREASE
Jacques L. Zakin, Hewlett, N.Y., assignor to Socony
Mobil Oil Company, Inc., a corporation of New York
No Drawing. Filed July 29, 1960, Ser. No. 46,113
12 Claims. (Cl. 252—28)

This invention has to do with new grease compositions, particularly grease compositions characterized by a high order of effectiveness throughout a wide range of severe operating conditions.

For many years, there have been developments of improved greases designed to meet ever-increasing demands for effective lubrication of machinery. However, with considerable progress being made in aircraft, missiles, rockets and advanced space craft, a need has arisen for greases resistant to high temperature operating conditions. Required are greases capable of functioning at temperatures in excess of 600° F.

It is an object of this invention, therefore, to provide greases capable of withstanding severe operating conditions. It is also an object to provide greases effective for high temperature use, such as 600° F. and higher. Other objects will be apparent from the following description.

such as methyl, ethyl, propyl, etc.; cycloalkyl such as cyclohexyl, etc.; aryl such as phenyl, cresyl, dimethylphenyl, naphthyl, anthraquinyl, etc.; substituted groups such as methoxyphenyl, ethyoxyphenyl, monochlorphenyl, dichlorphenyl, aminophenyl, etc.

Typical of such compounds are:

(1) 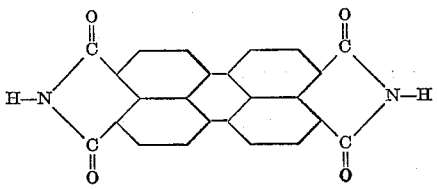
Perylimid (2) 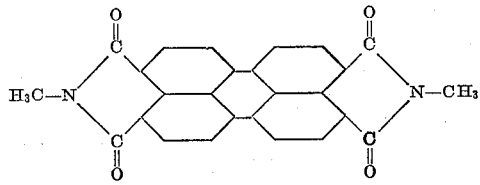
Methyl perylimid (3) 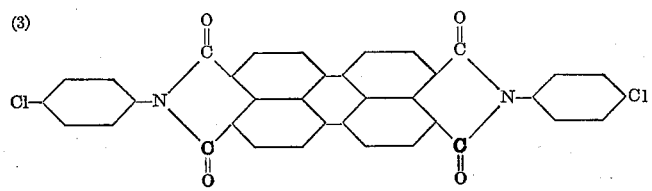
p-Chlorphenyl perylimid (4) 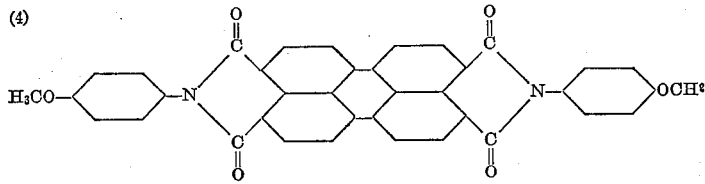
p-Methoxyphenyl perylimid This invention is predicated upon the discovery that greases of excellent character can be prepared from an oil of lubricating viscosity and a perylimid compound.

The gelling agents of this invention are perylimid compounds represented by the general formulae:

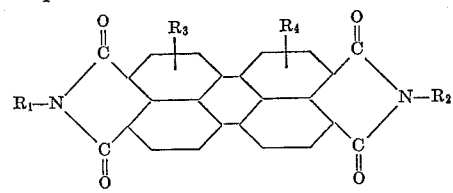

and

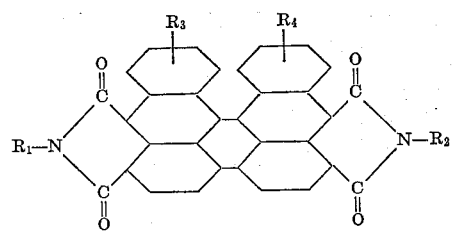

wherein $R_1$, $R_2$, $R_3$ and $R_4$ can be the same or different atoms or groups. $R_1$ through $R_4$ can be: hydrogen; alkyl (5) 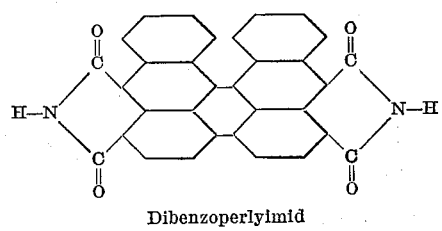
Dibenzoperlylimid Particularly preferred herein is the p-methoxy perylimid shown above as compound (4). This is available as Indo Brilliant Scarlet Toner, a product of Harmon Colors, National Aniline Division of Allied Chemical Corporation. This is a fine powder, having a specific gravity of 1.47, a bulking value of 12.24 pounds per gallon and an oil absorption of 46 (in a slightly bodied oil). Particle size of the powder is 1.3–1.4 microns (length) x 0.2 micron (width).

A method for the preparation of perylimid compounds is given in German Patent No. 386,057. This involves reaction of perylene-3,4,9,10-tetracarboxylic acid with ammonia or with a primary aliphatic or aromatic amine. Modifications of such method are provided in British Patent No. 26,690/13 and in United States Patents Nos. 2,543,747, 2,905,685 and 2,905,686. Methods for the preparation of a compound having a dibenzo perylene group

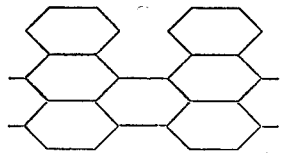

are described in British Patents Nos. 12584/13 and 1425/14. Reference is made to such disclosures for details in the preparation of the compounds of this invention.

While it is preferred that the compounds of this invention be used in substantially pure form (toner), it is to be understood that they can be used in the form of reduced toners. In the latter form, they are associated with an inert inorganic material such as an alumina hydrate, barium sulfate, clay, etc. When such inert inorganic materials are present, they are in amounts up to about 70 percent by weight, preferably less than about 50 percent by weight.

It is to be understood also that more than one of the compounds of this invention can be used together in a grease composition.

The compounds of this invention are stable at high temperatures, up to about 650° F. and beyond, and are well adapted for use in grease compositions formulated for high temperature operations. In this connection, they are much more effective than other pigments which have been suggested for use as grease gelling agents. Pigments found to be ineffective at 650° F. include the following:

(6) 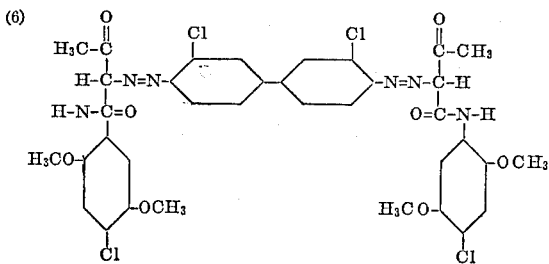

(7) 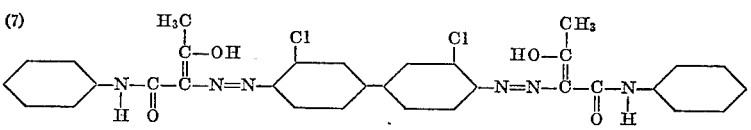

(8) 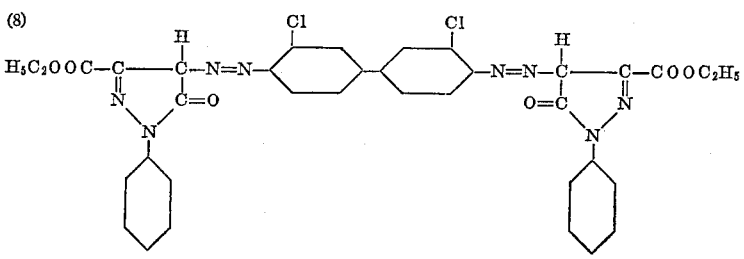

(9) 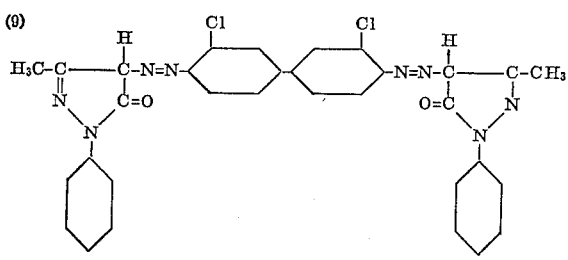

(10) 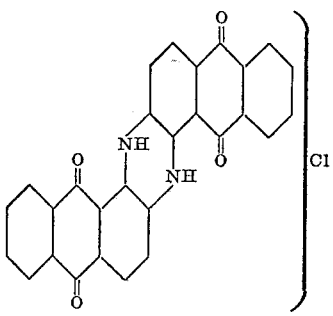

(11) 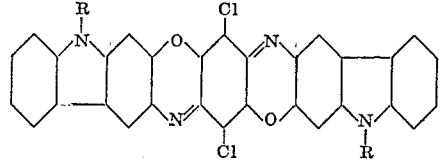

(12) 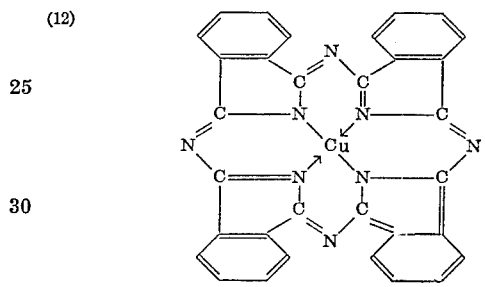

Oils used in the greases of this invention can be mineral or synthetic oils of lubricating viscosity. When high temperature stability is not a requirement of the finished grease, mineral lubricating oils can be used. Suitable mineral oils have a viscosity (S.U.V.) of at least 40 seconds at 100° F., and particularly those within the range of about 60 seconds to about 6000 seconds at 100° F.

Synthetic vehicles can be used, instead of mineral oils, or in combination therewith. Typical synthetic vehicles are: polypropylene, polypropylene glycol, trimethylol propane esters, neopentyl and pentaerythritol esters, di-(2-ethyl hexyl) sebacate, di-(2-ethyl hexyl) adipate, dibutyl phthalate, polyethylene glycol di-(2-ethyl hexoate), fluorocarbons, silicate esters, silanes, esters of phosphorus-containing acids, liquid ureas, ferrocene derivatives, hydrogenated mineral oils, chain type polyphenyls, siloxanes and silicones (polysiloxanes), alkyl-substituted diphenyl ethers typified by a butyl-substituted bis-(p-phenoxy phenyl) ether, phenoxy phenyl ethers, etc.

Particularly preferred, herein, are polysiloxanes and m-bis-(m-phenoxyphenoxy) benzene.

In the grease compositions contemplated herein, the perylimid gelling agents are used in quantities from about 5 to about 50 percent by weight, and preferably from about 15 to about 30 percent by weight. The vehicles described above constitute the balance of the compositions, except for relatively small quantities of the following characterizing materials which may be present.

It is to be understood, however, that the compositions contemplated herein can also contain other characterizing materials. For examples, antioxidants, corrosion inhibitors, viscosity index agents, fillers, etc., can be used. Among such materials are colloidal silica, calcium acetate, calcium carbonate and molybdenum disulfide. These characterizing materials do not detract from the lubricating value of the compositions of this invention, nor do they detract from the beneficial character of the perylimid compounds; rather, these characterizing materials serve to impart their customary properties to the particular compositions in which they are incorporated.

The greases of this invention are prepared by dispersing a perylimid compound in the vehicle. This may be accomplished by any mixing technique wherein solid particles are wetted by a fluid. One advantageous method involves wetting of the perylimid compound with a volatile liquid such as methyl alcohol and then adding the vehicle. The materials are milled together and warmed in order to remove the alcohol. A homogeneous product is obtained. Typical equipment for such use includes a colloid mill, 3-roll ink mill, Manton-Gaulin homogenizer and the like. Other advantageous techniques are the spray or jetting techniques described in applications of E. L. Armstrong et al., Serial Nos. 682,461, now Patent No. 2,950,248, and 683,815, now Patent No. 2,950,249, filed September 6 and 13, 1957, respectively.

Typical illustrative grease compositions of this invention were prepared by dispersing twenty percent by weight of a perylimid compound in a particular siloxane. The latter is a polymethylphenyl siloxane having a viscosity of 117 centistokes at 100° F. (Dow Corning Fluid 710). The perylimid compound was wetted with alcohol and the siloxane was added thereto. The materials were milled with a spatula on a glass plate until roughly homogeneous, and were warmed to drive off the alcohol. The dispersion was then milled on a Hoover Muller apparatus for four cycles each of 100 revolutions, with redistribution of the grease following each cycle.

Thickening power of the perylimid compounds was determined by measuring flow properties of several grease compositions. The flow properties were measured on a Ferranti plate-and-cone viscometer. An apparent viscosity at 1000 sec.$^{-1}$ and 100° F. was taken for comparison. In each instance the polymethylphenylsiloxane (2.98 poises at 100° F., 1000 sec.$^{-1}$) and 20 percent by weight of pigment was used. Results are given in Table I.

Table I

| Pigment: | Apparent viscosity, poises @ 100° F., 1000 sec.$^{-1}$ |
|---|---|
| None | 2.98 |
| Perylimid | 8.6 |
| p-Methoxyphenyl perylimid | 12.2 |

The results reveal that the perylimid compounds thicken the vehicle to a greater extent than would be predicted from a crude application of the Guth-Simha modification of the Einstein equation:

$$\eta = \eta_0(1 + 2.5\phi + 14.1\phi^2)$$

wherein $\eta$ = viscosity of "grease"
$\eta_0$ = viscosity of base fluid (vehicle)
$\phi$ = volume fraction of perylimid compound For example, the p-methoxyphenyl perylimid has a density of 1.47 and the siloxane a density of 1.07. Thus, a value of 5.1 poises would be predicted:

$$\eta = 2.98\left[1 + 2.5\left(\frac{\frac{0.2}{1.47}}{\frac{0.2}{1.47} + \frac{0.8}{1.07}}\right) + 14.1\left[\frac{\frac{0.2}{1.47}}{\frac{0.2}{1.47} + \frac{0.8}{1.07}}\right]^2\right]$$

$$\eta = 5.1 \text{ poises}$$

Instead of a value of 5.1 the actual value is a rather surprising 12.2.

Several greases were also tested for bearing performance. The test used was that described in Coordinating Research Council Incorporated, Test Method L-35. This involves the use of a 204S-17 ball bearing running at 10,000 r.p.m. A 15 pound radial load (from belt) and a 5 pound thrust load (from spring) were imposed. The bearings were run for 20 hours, then stopped and cooled for 4 hours; this constitutes one cycle. The greases shown in Table II were prepared in the same manner as those shown in Table I. In some instances, ethers were used as the vehicle instead of a siloxane. In some instances, a small amount of a colloidal silica was incorporated in a composition.

Table II

[Tests at 550° F.]

| Vehicle, Percent | Perylimid Compound, Percent | Colloidal Silica, Percent | Hours To Bearing Failure |
|---|---|---|---|
| DC Fluid 710; 80 | p-methoxyphenyl perylimid; 20. | | 160 (8 cycles). |
| Polyether a; 75 | p-methoxyphenyl perylimid; 25. | | 81 (4 cycles). |
| Polyether a; 80 | p-methoxyphenyl perylimid; 20. | | 39 (1+ cycles). |

[Tests at 600° F., 20 hour cycle on, 4 hours off]

| Vehicle, Percent | Perylimid Compound, Percent | Colloidal Silica, Percent | Hours To Bearing Failure |
|---|---|---|---|
| DC Fluid 710; 80 | p-methoxyphenyl perylimid; 20. | | 59 (3 cycles). |

[Tests at 650° F., continuous running]

| Vehicle, Percent | Perylimid Compound, Percent | Colloidal Silica, Percent | Hours To Bearing Failure |
|---|---|---|---|
| DC Fluid 710; 80 | p-methoxyphenyl perylimid; 20. | | 33. |
| DC Fluid 710; 86.5 | p-methoxyphenyl perylimid; 10. | Silica b; 3.5 | 17. |
| Polyether a; 80 | p-methoxyphenyl perylimid; 20. | | 5. |
| Polyether a; 86.5 | p-methoxyphenyl perylimid; 10. | Silica b; 3.5 | 9. |
| DC Fluid 710; 40 / Polyether a; 40 | p-methoxyphenyl perylimid; 20. | | 13. | a m-Bis-(m-phenoxyphenoxy) benzene.
b This is submicroscopic a pyrogenic silica having a particle size of 0.015-0.020 micron. It is supplied by Godfrey L. Cabot, Inc. under the tradename "Cab-O-Sil".

The data indicate that the greases are surprisingly effective in this rigorous high temperature test.

That the perylimid compounds of this invention have the desired thermal stability for high temperature greases is revealed by the following test data. The compounds were dried in an oven at 220° F., 65 hours at 450° F., 20 hours at 550° F., and finally heated for 20 hours at 650° F. Each compound was in the form of a fine powder when placed in an open glass beaker, when the latter was placed in the oven. Results of the tests are given in Table IV below:

Table IV

| Compound | Original | After Test | Wt. Loss, Percent | Texture After Test |
|---|---|---|---|---|
| Perylimid | Deep Purple | Unchanged | 3 | Powdery. |
| p-Methoxyphenyl perylimid. | Dark Red | Slightly Darker. | 3 | Do. |

The compounds did not melt or grossly decompose when heated for an additional 2½ hours at 750° F.

In contrast to the results set forth in Table IV, each of the compounds identified above as compounds (6) through (11) decomposed at or below 650° F.

As indicated above, the new lubricants can be used for a wide range of industrial applications. Typical applications are for lubrication of the machinery, mechanisms and vehicles mentioned above. In addition, greases constituted of the thickeners contemplated herein and of a vehicle resistant to radiation (such as a phenoxy phenyl ether), can be used for lubrication of equipment exposed to atomic radiation harmful to lubricants.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

I claim:
1. A grease capable of functioning at temperatures as high as about 600° F. and consisting essentially of an oil of lubricating viscosity and from about 5 to about 50 percent by weight of a perylimid compound represented by the general formulae:

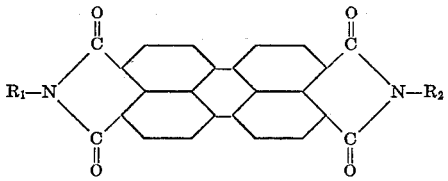

and

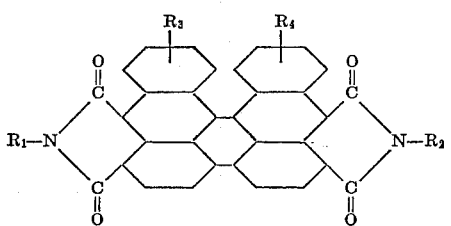

wherein $R_1$, $R_2$, $R_3$ and $R_4$ are selected from the group consisting of hydrogen, alkyl, cycloalkyl, aryl, alkaryl, anthraquinyl, alkoxyaryl, haloaryl and aminoaryl.

2. A grease defined by claim 1 wherein the oil is a mineral oil.

3. A grease defined by claim 1 wherein the oil is a polysiloxane.

4. A grease defined by claim 1 wherein the oil is a phenoxyphenyl ether.

5. A grease defined by claim 1 wherein the compound is perylimid.

6. A grease defined by claim 1 wherein the compound is p-methoxyphenyl perylimid.

7. A grease defined by claim 1 wherein the perylimid compound is present in an amount between about 5 and about 50 percent by weight of the grease.

8. A grease defined by claim 1 wherein there is also present up to about 10 percent by weight of the grease, of a colloidal silica.

9. A grease capable of functioning at temperatures as high as about 600° F. and consisting essentially of a polymethylphenylsiloxane and from about 5 to about 50 percent by weight of the grease of p-methoxyphenyl perylimid.

10. A grease capable of functioning at temperatures as high as about 600° F. and consisting essentially of a polymethylphenylsiloxane, from about 15 to about 30 percent by weight of the grease of p-methoxyphenyl perylimid and up to about 10 percent by weight of the grease of a colloidal silica.

11. A grease capable of functioning at temperatures as high as about 600° F. and consisting essentially of m-bis-(m-phenoxyphenoxy) benzene and from about 5 to about 50 percent by weight of the grease of p-methoxyphenyl perylimid.

12. A grease capable of functioning at temperatures as high as about 600° F. and consisting essentially of m-bis-(m-phenoxyphenoxy) benzene, from about 15 to about 30 percent by weight of the grease of p-methoxyphenyl perylimid and up to about 10 percent by weight of the grease of a colloidal silica.

References Cited in the file of this patent

UNITED STATES PATENTS

| 2,597,018 | Merker et al. | May 20, 1952 |
| 2,677,658 | Bidaud | May 4, 1954 |
| 2,679,480 | Brannen et al. | May 25, 1954 |
| 2,681,314 | Skinner et al. | June 15, 1954 |
| 2,851,418 | Lyons et al. | Sept. 9, 1958 |
| 2,905,685 | Eckert et al. | Sept. 22, 1959 |
| 2,915,470 | Armstrong et al. | Dec. 1, 1959 |
| 3,025,241 | Dreher et al. | Mar. 13, 1962 |

UNITED STATES PATENT OFFICE
CERTIFICATE OF CORRECTION

Patent No. 3,126,341                          March 24, 1964

Jacques L. Zakin

It is hereby certified that error appears in the above numbered patent requiring correction and that the said Letters Patent should read as corrected below.

Column 2, fourth formula, the right-hand portion should appear as shown below instead of as in the patent:

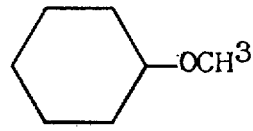

column 3, the sixth formula should appear as shown below instead of as in the patent:

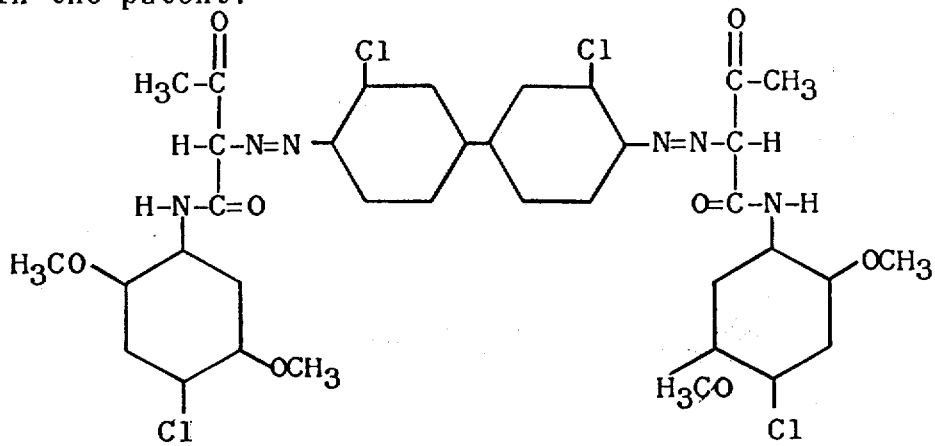

column 7, Table IV, last column thereof, for

Powdery.      read      Powdery.
         Do.                       Powder.

Signed and sealed this 28th day of July 1964.

(SEAL)
Attest:

ESTON G. JOHNSON                           EDWARD J. BRENNER
Attesting Officer                            Commissioner of Patents